United States Patent [19]

Smith

[11] 4,088,449

[45] May 9, 1978

[54] APPARATUS FOR FORMING SILICATE PRODUCTS

[75] Inventor: Fred Smith, Norwich, England

[73] Assignee: Anglian Water Authority, Huntingdon, England

[21] Appl. No.: 751,863

[22] Filed: Dec. 17, 1976

Related U.S. Application Data

[63] Continuation-in-part of Ser. No. 624,816, Oct. 22, 1975, Pat. No. 4,016,097.

[51] Int. Cl.$^2$ .......................... B01J 13/00; B01F 5/00
[52] U.S. Cl. ..................................... 23/283; 210/205; 366/337; 366/339; 423/330
[58] Field of Search ............. 23/283, 252 R; 259/4 R, 259/4 A, 4 AB, 4 AC; 423/329, 330; 210/47, 49, 205

[56] References Cited

U.S. PATENT DOCUMENTS

| | | | |
|---|---|---|---|
| 1,626,487 | 4/1927 | Warren | 259/4 R |
| 1,756,625 | 4/1930 | Behrman | 423/330 |
| 2,190,596 | 2/1940 | Dorr | 210/49 |
| 2,817,500 | 12/1957 | Robinson | 23/252 R |
| 3,223,388 | 12/1965 | Knox | 23/252 R X |
| 3,286,992 | 11/1966 | Armeniades et al. | 23/252 R X |
| 3,358,749 | 12/1967 | Chisholm et al. | 259/4 R |
| 3,540,474 | 11/1970 | Sharples | 259/4 R |
| 3,618,901 | 11/1971 | Sindgren | 259/4 R |
| 3,743,250 | 7/1973 | Fitzhugh, Jr. et al. | 259/4 R |
| 3,902,850 | 9/1975 | Lehnert | 23/252 R |
| 3,963,640 | 6/1976 | Smith | 210/47 |

*Primary Examiner*—Morris O. Wolk
*Assistant Examiner*—Roger F. Phillips
*Attorney, Agent, or Firm*—Lawrence Rosen; E. Janet Berry

[57] ABSTRACT

Apparatus is described that is useful for making a stable aqueous dispersion of a complex alkali metal-aluminium-silicate which is soluble in hydrochloric acid. The apparatus comprises a mixing tube, at least two inlets through which aqueous streams can pass into one end of the tube, one of the inlets being for the supply of the bulk of the water for the process at a pressure of at least 40 psi, an outlet at the other end of the tube, and stationary means within the apparatus for causing the aqueous streams to adopt a generally helical path and to mix with one another with shear, and for causing the product leaving the outlet to be at a pressure of atmospheric pressure or less and which is at least 40 psi below the pressure in the inlet of the bulk of the water.

8 Claims, 8 Drawing Figures

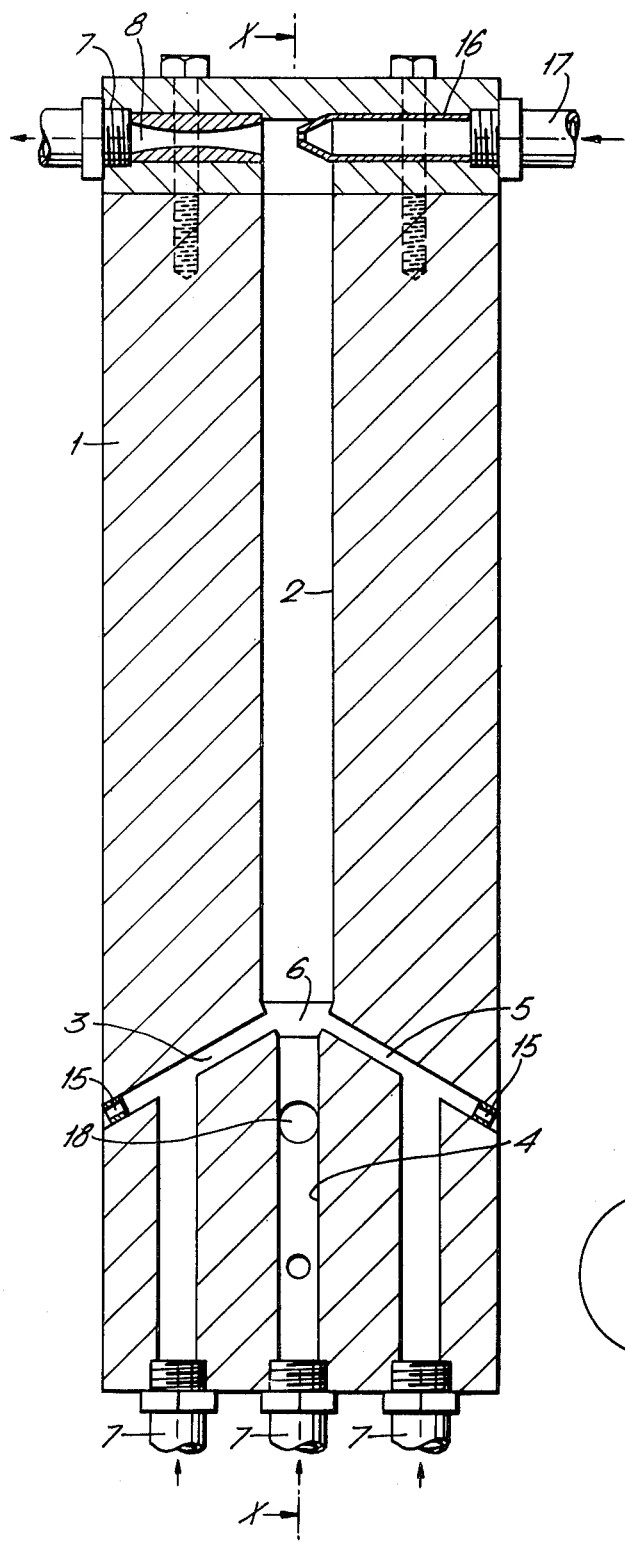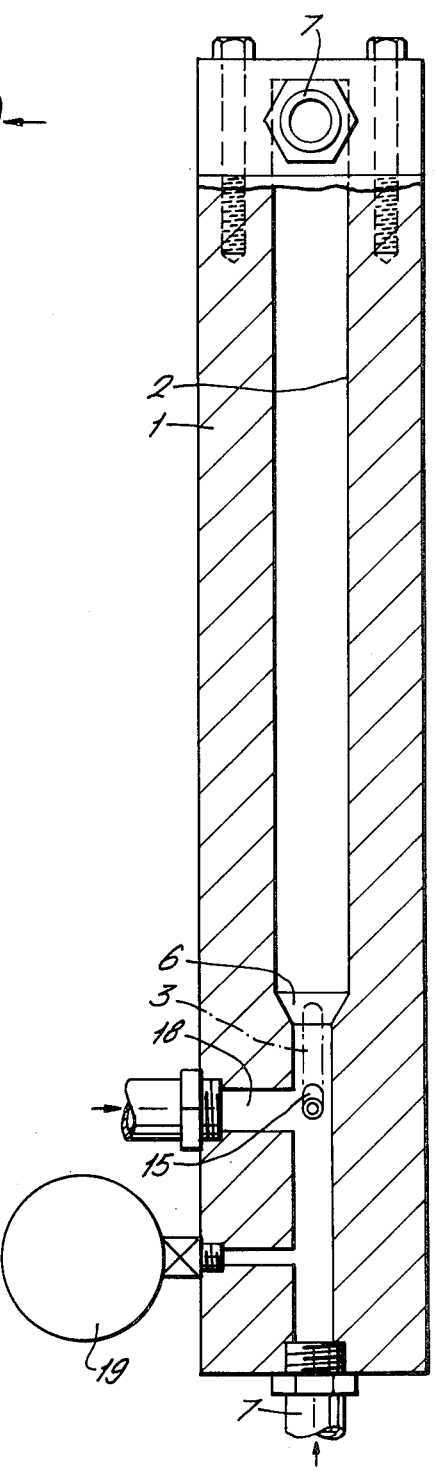

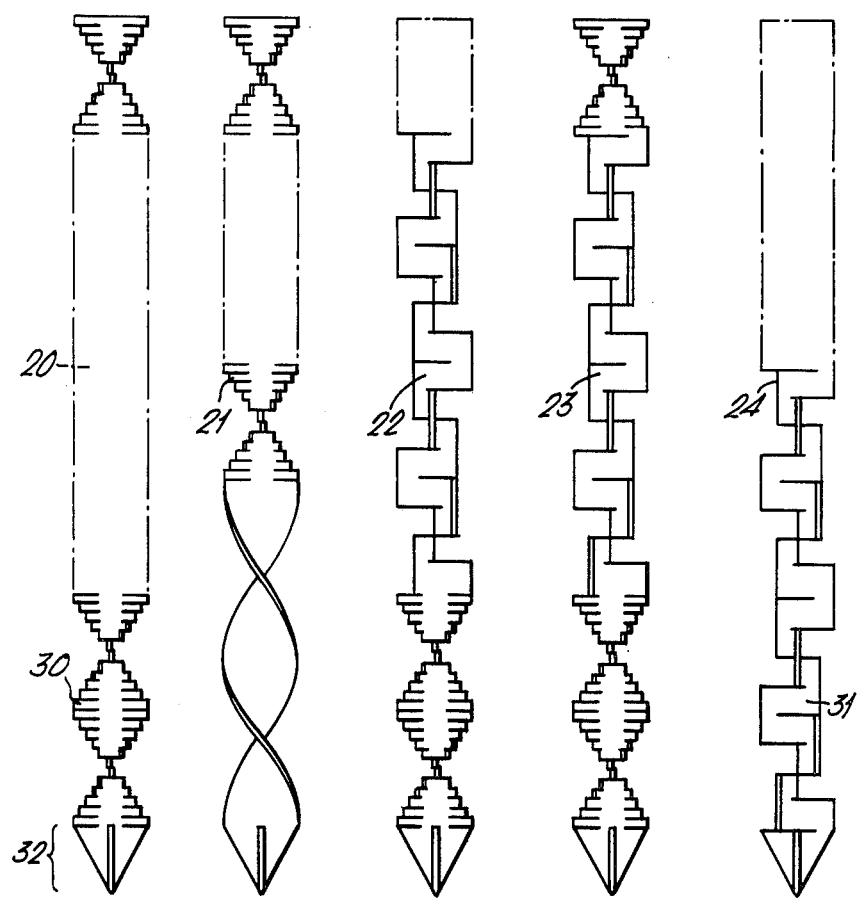

APPARATUS FOR FORMING SILICATE PRODUCTS

This application is a continuation-in-part of my U.S. application Ser. No. 624,816 filed Oct. 22, 1975, now U.S. Pat. No. 4,016,097.

We have described in British patent specification No. 1,399,598 how a complex alkali metal-aluminium-silicate material that is completely soluble in hydrochloric acid may be made by a process comprising mixing with high shear an aqueous solution of alkali metal silicate and an aqueous solution of an aluminium salt in such proportions and under such conditions that a complex alkali metal-aluminium-silicate polymeric material is formed substantially immediately upon contact of the solutions and is rendered into a stable dispersion in water. The particular method of providing high shear that is described comprises the use of a high speed rotor.

Apparatus suitable for use in this method is described in that specification and also, in more detail, in British patent specification No. 1,399,599. It comprises a mixing chamber, at least three separate inlets for liquids to the chamber, an outlet duct at a position distant from the inlets, an hydraulic ejector to which the outlet duct leads and means for mixing under high shear within the chamber the material introduced through the inlets. In practice the chamber is normally an upright vessel with the inlets leading into the bottom of it and the outlet leading out from it near its top and the means for applying high shear is close to the bottom of the vessel and generally comprises rotor blades and means for rotating the rotor blades at a speed greater than 1000 rpm.

This apparatus and the various controls associated with it for the flow of liquids, adjusting the speed of the rotors and so forth is capable of being operated with great precision to achieve very fine variations in the rate of throughput and composition of the product. It is accordingly very suitable in those instances where accurate control is essential, in particular when the product is being dosed direct into a municipal water supply to assist in the purification of that supply. However, there are many instances, for example in the purification of sewage and industrial effluents, where such great accuracy in control is not really necessary and instead it would be adequate if a simpler apparatus, and in particular one that did not have to be machined to such fine limits and involve such high rotation speeds, could be used. Ideally we would have an apparatus that can be devoid of a high speed rotor or other moving parts and yet can be used for achieving shear sufficiently high that upon mixing water, aluminium sulphate and sodium silicate in the apparatus a product is obtained that is very similar to that which is obtained by the preferred process described in British patent specification No. 1,399,598.

According to the present invention, a stable aqueous dispersion of a complex alkali metal-aluminium-silicate having a pH of 3 to 7.5, which contains up to 5% silicate, measured as $SiO_2$, and which is soluble in hydrochloric acid, is prepared by mixing with shear an aqueous solution of alkali metal silicate and an aqueous solution of an aluminium salt and the process is characterised in that the mixing with shear is conducted in apparatus comprising a mixing tube, at least two inlets through which aqueous streams can pass into one end of the tube, and an outlet at the other end of the tube, by supplying the bulk of the water to the tube through one inlet and the aqueous solution of alkali metal silicate through another inlet, causing the aqueous streams from each inlet to adopt a generally helical path and to mix with shear sufficient to render the product soluble in hydrochloric acid by stationary means positioned in the tube, and removing the aqueous dispersion through the outlet at a pressure which is at least 40 psi (2.8 kg per $cm^2$) lower than the pressure at the inlet through which the bulk of the water is supplied.

Apparatus according to the invention comprises a mixing tube, at least two inlets through which aqueous streams can pass into one end of the tube, one of the inlets being for the supply of the bulk of the water for the process at a pressure of at least 40 psi, an outlet at the other end of the tube, and stationary means within the apparatus for causing the aqueous streams to adopt a generally helical path and to mix with one another with shear, and for causing the product leaving the outlet to be at a pressure of atmospheric pressure or less and which is at least 40 psi below the pressure in the inlet of the bulk of the water.

If the apparatus only has two inlets the silicate solution goes through one of them and the bulk of the water and the aluminium salt solution goes through the other, this other inlet having a greater diameter than the inlet for the silicate. Preferably, however, the aluminium salt solution is fed through an inlet separate from the inlet for the bulk of the water and so the apparatus preferably has three inlets.

The bulk of the water must be delivered under pressure, and usually the other stream or streams are as well. The bulk of the water is generally delivered through an inlet pipe that has a diameter at least as great as the diameter of the or each of the other inlet pipes, and often one and a half or even two times the diameter of the other pipe or pipes.

In order to facilitate making the streams pass in a general helical path and entrain each other without substantial initial mixing, it is preferred that the inlet pipes are all at an angle of more than 120° to the mixing tube. When there are three inlet pipes it is preferred that two should be at an angle of more than 120°, e.g. about 135°, and the third should be at 180°, i.e. having a common axis with the mixing tube. Preferably the inlet pipes and the mixing tube are in a common plane.

The helical motion to which the aqueous streams are subjected in the process of this invention necessarily involves some degree of entrainment of the streams with one another and approximates to the effect achieved by having rotors moving at very high speed, as in British patent specification No. 1,399,598. Factors such as the length and cross-sectional area of the tube, the pressure drop along the tube, and the number of helical turns which the stationary means cause the aqueous streams to perform, influence the degree of mixing of the alkali metal silicate and aluminium salt. It is important that the stationary means should not be such that they simply cause shear at the interfaces of the adjacent streams, as would be the case if a single unbroken helical strip, or thin baffles whose faces are absolutely parallel to the flow, were provided in the tube. Conversely, the stationary means should not be such that mixing takes place without any shear. Thus mere positioning of baffles randomly along the tube transverse to the length of the tube, for instance as in an open launder, would not be satisfactory because the flow would not be helical but would rather, figuratively, be zigzag. Similarly, when aqueous streams of alkali metal silicate and of an aluminium salt are injected perpendicularly into a mixing tube and onto the stream of the bulk of the water without any means being provided for constraining the various streams to maintain some laminar characteristics and to entrain each other, again the results would not be satisfactory. It is easy to observe whether or not the necessary helical entrainment, mixing and shear is being conducted, since if it is not an acid soluble product in the form of a stable dispersion is not obtained. Instead silica or other insoluble material will precipitate out either immediately or on standing.

In one embodiment of the present invention, the inlet pipe for the bulk of the water terminates in a slot-shaped orifice through which a sheet of water (and sometimes aluminium salt) is discharged. The sheet, and therefore the orifice used to form it, is preferably annular. The annular slot is preferably defined by, externally, the outer walls of the end of its inlet pipe and, internally, by a cone that fits in this inlet, where the inlet pipe joins the mixing tube. The means for giving some degree of helical flow may be on or adjacent the surface of the cone, for example grooves on the surface of the cone or on the walls of the inlet, or ribs between the cone and the inlet wall. These grooves or ribs may be helical, or partly helical. The cone is preferably positioned with its apex downstream. The water inlet containing the cone is preferably coaxial with the mixing tube. The conical walls of the cone preferably extend out from that inlet pipe across the openings leading from the other inlet pipe or pipes at the inlet end of the mixer tube. The bulk of the water is fed along its inlet pipe to the cone and then passes around the sides of the cone to form an annular sheet, which will have helical motion if there are one or more spiral grooves in the cone, and which will be under high pressure. The pressure in the annular sheet and in the pipe leading to the cone is controlled partly by appropriate choice of dimensions for the cone and the annular slot. The other inlet or inlets are directed towards the surface of the cone and so the stream or streams from them accentuate the Coanda effect whereby the sheet is attracted to the sides of the cone and little or no mixing occurs between the streams at this stage.

When the entrained streams reach the apex of the cone, turbulent flow increases substantially instantaneously to give a high degree of shear.

The high shear mixing provided by the cone may alone be sufficient to give a stable dispersion of an acid soluble product but it is usually preferred that the mixing tube should include means for causing turbulent mixing and/or helical flow along its length. Desirably these further means cause the aqueous stream to travel in a generally helical path, and may comprise baffles arranged along the tube. The baffles may conveniently be arranged in such a manner as to cause reversal of the entrained helical flow along the cone and thus provide a broken or continuous spiral in the opposite direction. Alternatively, the baffles may be provided in the form of a shear helix i.e. a solid member, usually in the form of a sheet, twisted into a helix and cut from its outer edges towards the centre, usually at right angles to the axis of the helix, at intervals along the length of the helix, or more than one such member in end to end relationship. This provides individual baffles, and, if the member is of substantially the same width as the diameter of the tube, the baffles extend over the whole tube. The cutting usually extends over e.g. from one quarter or one half to 95% or more of the width of the sheet.

Preferably the shear helix, which is usually made of metal although it may be, for example, of a plastics material, extends substantially throughout the length of the mixing tube, although a section thereof may be uncut in order to provide a section in which the liquid streams are entrained but not subjected to a high degree of mixing.

The cutting and twisting of the sheet means that each baffle is at an angle to a plane through the axis of the tube. It is this angle which causes the aqueous streams to be diverted from a straight path up to the tube and to follow a generally helical path. The incidence of the aqueous streams on the angled baffles can approximate to the effect achieved by the provision of rotor blades at an angle to the vertical in the apparatus used in the process of British patent specification No. 1,399,598. In fact we have found that a desirable product can be prepared simply by the provision of a shear helix in the mixing tube, without the need for a cone of the type described above, although generally both cone and shear helix are used.

Preferably the inlet pipes and mixing tube are moulded or otherwise formed in a single sold block of plastics or other material. The shear helix and/or cone or other means for causing the helical motion are preferably removably fitted within the apparatus.

The length of the mixing tube will generally be chosen such that the average pressure drop along the tube is at least 4 psi per inch (0.11 kg per cm$^2$ per cm). When a cone is used at the water inlet, the rate of pressure drop along the cone will be substantially greater than along the rest of the tube. For instance when a cone is present the pressure drop along its length is usually at least 40 psi, preferably at least 60 or 80 psi. The length of the tube is usually at least 15 or 20 cm and usually less than 50 cm, and it may be, for example, 28 or 30 cm long. The diameter of the mixing tube is generally at least 5 mm but preferably less than 20 mm and is preferably between 8 and 12 mm. The diameters of the inlet pipes will generally vary between 5 and 20, preferably 5 to 10, mm for the main inlet pipe through which the bulk of the water is supplied to the tube, and from 2 to 10, preferably between 2 and 6 mm for the other pipe or pipes.

Usually the apparatus is designed such that the aqueous dispersion is removed through the outlet at, or below, substantially atmospheric pressure, and the pressure of the bulk of the water at the inlet is at least 40 psi (2.8 kg per cm$^2$). Generally the pressure difference between the inlet and the outlet is at least 60 psi (4.2 kg per cm$^2$) and often more than 80 psi (5.6 kg per cm$^2$). The large rate of pressure drop along the length of the tube, and the large total pressure drop, contribute to the mixing and shear effects that are needed in the invention for best results.

The product is preferably removed through the outlet under the influence of an hydraulic ejector. Thus often the pressure at the outlet will be at least 5, and preferably at least 10 e.g. 20, psi vacuum. The water which is introduced through the hydraulic ejector will dilute the silicate complex and this may be desirable if the product is to be used directly in the treatment of water supplies. In this way the volume of water introduced through the inlets can be minimized to the amount necessary to form a stable dispersion before any further dilution.

It is found desirable to observe a relationship between silicate content and pH such that at lower silicate contents the lower pH values are used and at higher silicate contents the higher values are used. Suitable ranges of pH values to obtain a product with optimum properties are set out in Table I, and in Table II the preferred pH values, at different silicate contents, are given. Naturally values for silica concentrations not quoted in the Tables can be obtained by interpolation.

TABLE I

| % silicate (as SiO$_2$) | pH range |
|---|---|
| 0.5 | 3–4.2 |
| 1.0 | 3–4.3 |
| 1.5 | 3.2–4.5 |
| 2.0 | 3.4–4.6 |
| 3.0 | 3.7–4.9 |
| 4.0 | 4.3–5.4 |
| 5.0 | 5.5–7.5 |

TABLE II

| % silicate (as SiO$_2$) | optimum pH |
|---|---|
| 0.5 | 3.6 |
| 1.0 | 3.7 |
| 1.5 | 3.8 |
| 2.0 | 4.0 |
| 3.0 | 4.3 |
| 4.0 | 4.9 |
| 5.0 | 6.5 |

The aluminium salt is normally the sulphate, but other aluminium salts, such as, for example, alums and aluminium nitrate, can also be used. Commercially available aluminium sulphate may be used, but it is of course desirable that this should not be too contaminated with acid.

The silicate is usually sodium silicate and normally is initially obtained as a concentrated aqueous solution that has a very high pH, for example 12 to 13, and the amount of water used in the process is usually such that, in the absence of the aluminium sulphate or other salt, the pH of the diluted solution of sodium silicate would be below 11.6 and most preferably below 11.3. Potassium silicate can be used instead of sodium silicate.

The amount of water fed to the apparatus, by volume, is normally very large compared with the amount of sodium silicate and aluminium sulphate. For example, the volume of water is normally at least 20 times the volume of sodium silicate, measured as a concentrated aqueous solution, and usually is at least 40 times the volume of the silicate solution. If insufficient water is present the product is more concentrated than is desired, although, as described above, the water introduced through an hydraulic ejector at the outlet of the apparatus may provide the necessary dilution. Usually the bulk of the water supplied through the main inlet to the apparatus is free of both sodium silicate and aluminium sulphate. Thus, in general, the concentrations and relative rates of flow of the aqueous streams supplied to the mixing tube will be the same as described in British patent specification No. 1,399,598.

The invention will now be described with reference to the accompanying drawings in which:

FIG. 2 is a section through another embodiment;

FIG. 3 is a section along the axis X — X of FIG. 2; and

FIGS. 4 to 8 are representations of shear helices suitable for use in the apparatus shown in FIGS. 2 and 3.

Figure 1:
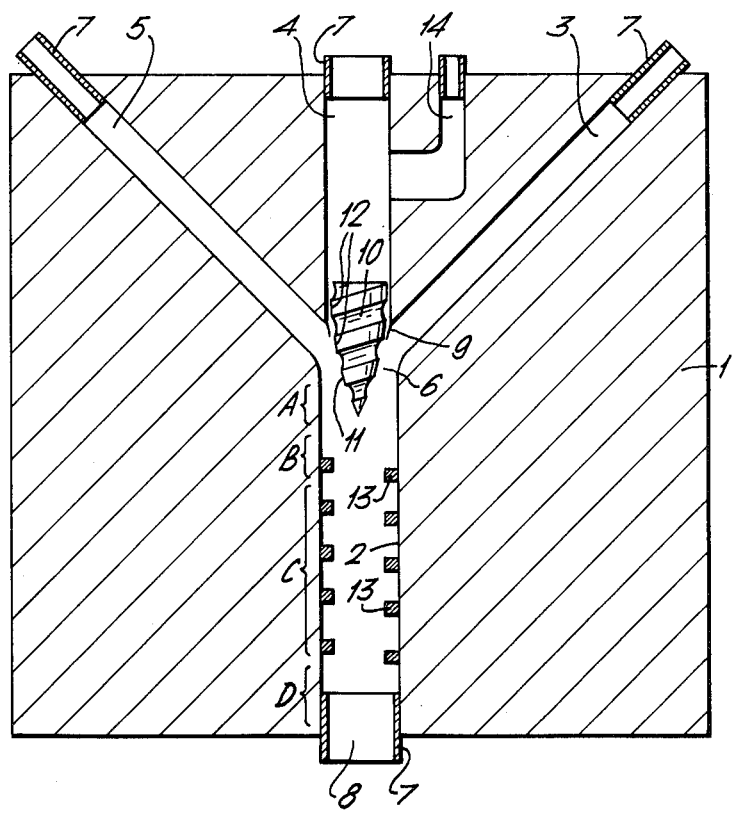
FIG. 1 is a section through one embodiment of the apparatus of this invention.

The apparatus that is illustrated in FIG. 1 comprises a block 1 of plastic material, usually a clear plastic, a mixing tube 2 and inlet pipes 3, 4 and 5 that merge together to a single inlet 6. Adaptors 7 may be fitted in the outlet 8 from the mixing tube and at the points of entry to the inlet pipes to permit the connection of suitable ducting to feed the liquids to the apparatus and to discharge the product from the apparatus.

Often the outlet 8 discharges direct into the liquid being treated, with the result that the pressure in the tube is then substantially atmospheric and no adaptor 7 is required at the outlet.

At the point where the inlet pipe 4 approaches the common inlet 6 the pipe is itself machined as shown at 9 to provide a seat for a cone 10 which is positioned at the end of this pipe to define an annular orifice. The sides 11 of the cone extend through the common inlet 6 a sufficient distance that streams of sodium (or potassium) silicate from the pipe 3 and aluminium sulphate from pipe 5 come under the influence of the high pressure annular sheet of water forced around the sides of the cone. Due to the grooves 12 the sheet has a helical motion. The pressure prevailing then drops substantially immediately to that prevailing in the rest of the mixing tube, e.g. atmospheric to 20 p.s.i. (1 to 1.4 kg per cm$^2$), with resultant high hydraulic shear in the zone marked A.

The product then comes up against a continuous helical baffle 13 which is positioned to reverse any direction of rotation the sheet may have had, as a result of which high turbulent mixing occurs in zone B. Very thorough mixing continues through zone C (where the baffle B is present) and through zone D (where there is no baffle) and finally the product emerges from outlet 8, all within a fraction of a second. Optimum length of the zones B, C and D will readily be found by experiment and will depend upon, for example, flow rates and diameters. Usually zone B is very close to the inlet 6, the uppermost part of the helix 13 being from 0.1 to 2 centimeters from the lowermost point at which pipes 3 and 5 merge with the cylindrical walls of tube 2.

In a typical apparatus the diameter of the cone, and therefore substantially the diameter of the inlet pipe 4, may be about two-thirds of the height of the cone and may be about twice the diameter of the inlet pipes 3 and 5. For example inlet pipes 3 and 5 may be about 6 mm. diameter, inlet pipe 4 may be about 12 mm. diameter and the cone may be about 18 mm. long. The helix 13 may extend over, for example, 5 to 10 centimeters and the zone D may be from 1 to 10 centimeters. Typical dimensions of the block may be, for example, 30 centimeters high, 15 centimeters wide and 5 centimeters deep.

In use a high-pressure water stream, usually at a pressure above 100 p.s.i. (7 kg per cm$^2$), is introduced through inlet pipe 4 while sodium silicate is introduced to pipe 5 and aluminium sulphate solution through pipe 3. The flow-rates and concentrations, and therefore the pH values, should all be selected as described in British patent specification No. 1,399,598. As an example, if the product is to be used to treat 25 million gallons per day at a dosage of 2 ppm measured as SiO$_2$ and is to have a concentration of 2% measured as SiO$_2$ the flow of water through pipe 4 could be about 100 gallons per hour while if the dosage was 4 ppm and was to treat 100 million gallons per day the flow of water could be 800 gallons per hour.

The product obtained by the process can be very similar to the product obtained by the process described in British patent specification No. 1,399,598 although in some instances the degree of polymerisation may be reduced. However it is necessary that, for example, the zone C should not be so long that the degree of polymerisation at the particular pH and concentration values being used in any particular experiment is reduced so far that the dispersion becomes unstable.

The product obtained by using the apparatus of the invention is of course soluble in hydrochloric acid and it is desirable that the apparatus should include means for washing it with hydrochloric acid. Conveniently this means comprises a feed for hydrochloric acid to the water-inlet pipe at a position on the feed side of the mixing cone. In the apparatus illustrated a feed pipe 14 is provided for this purpose.

The apparatus can be constructed from any suitable material. As indicated it is preferably made of plastic but all or part of it, for example, the helix 13 or the cone 10, may be of a non-corrodable metal.

The apparatus shown in FIGS. 2 and 3 has the same basic components as that shown in FIG. 1. It also comprises cleaning ducts 15, a hydraulic ejector 16 having an inlet 17, an acid inlet 18 and a pressure gauge 19.

In operation of the apparatus, a shear helix such as one of shear helices 20 to 24 shown in FIGS. 4 to 8, respectively, is inserted in the mixing tube 2.

Each of the shear helices consists essentially of a sheet of metal twisted to form a helix. Thus in shear helix 23 there are seven complete turns of the sheet. At the base of each shear helix is a section 32 which is not in fact twisted but has an X-shaped cross-section. This portion fits into the inlet end 6 of the mixing tube and it is in this section that the streams are initially entrained.

In each of shear helices 20, 21, 22, 23 and 24 the twisted sheet is cut perpendicular to the axis of the helix to provide vanes which are such as to ensure that there is both mixing of the streams and helical motion. The sheets are cut before twisting and the vanes slant away from the axis of flow and thus cause some turbulence, although their orientation is such as to ensure helical motion and some entrainment of the streams with each other. Shear helix 21 is unslotted for two complete turns of the helix and thus the required change in degree of turbulence will not occur until the streams have passed this section.

The two types of vanes in the shear helices i.e. narrow and broad vanes, are shown respectively as 30 in helix 20 and 31 in helix 24. The narrow vanes 30 are provided by slotting the metal sheet at regular narrow intervals to a distance between, say, ¼ and ½ of the width of the sheet. The broad vanes 31 are provided by slotting the sheet at wider intervals to a distance greater than ½ the width of the sheet. It is of course preferred that the vanes are wider when the depth of cutting is deeper since otherwise the vanes are too narrow and long to provide the desired degree of resistance to the flow and thus provide the desired turbulence.

The following Example illustrates the invention.

EXAMPLE 1

Apparatus of the type described above is used, in which the mixing tube is 30 cm long and 2.5 cm in diameter, and into which a shear helix of type 21 is inserted to provide a snug fit. The flow rates, concentrations and pH values are all selected as described in British patent specification No. 1,399,598 and the product is similar to that obtained in use of the apparatus of FIG. 1.

With both types of apparatus, the inlet pipes for the sodium silicate and aluminium sulphate solutions are conveniently connected to the apparatus through proportioning pumps that control the rate of flow, the water may be fed to the apparatus through any convenient control mechanism, and there may be a timer between the hydrochloric acid store and the hydrochloric acid inlet to permit washing at predetermined intervals. A suitable control mechanism for the water flow is through a Flostat (trade name for apparatus which keeps the water flow constant) and incorporates a solenoid valve which induces the acid wash flow after a predetermined time.

The product may be collected in containers, for example barrels, and subsequently shipped to its point of use but as the concentration of the product, measured as $SiO_2$, is normally below 5%, and often is very low, it is usually more convenient to discharge the product either direct into the sewage or other aqueous suspension. The product obtained by use of the apparatus described is adequate to serve as a partial coagulant aid and has floc weighting properties. It can be used on any industrial effluent treatment process requiring rapid sedimentation of suspended particles especially when the volume of water to be treated is relatively small and the final quality is to be suitable for normal disposal purposes. The process is also of great value in sewage effluent treatment where large volumes are to be treated by clarification and sedimentation processes only before or after sludge digestion. It is easily possible so to design the apparatus that it can be used to produce sufficient coagulant aid to dose up to 25 million gallons of water per day, or even up to 100 million gallons of water per day.

I claim:

1. Apparatus suitable for use in the production of a suitable aqueous dispersion of a complex alkali metal-aluminium-silicate which is soluble in hydrochloric acid, the apparatus comprising a mixing tube, at least two inlets through which aqueous streams can pass into one end of the tube, one of the inlets being for the supply of the bulk of water for the process at a pressure of at least 40 psi, an outlet at the other end of the tube, and a stationary cone which fits in one inlet with its apex downstream and which defines an annular slot with the outer walls of that inlet, the apparatus further comprising means on or adjacent to the surface of the cone for causing helical flow of an annular sheet of liquid passing through the annular slot, in which apparatus the at least one other inlet is directed towards the surface of the cone, the apparatus further comprising a stationary shear helix fitted within the mixing tube, in which the shear helix comprises a series of baffles offset from one another along a helical path and each arranged at an angle such that it causes helical flow along the tube, the helical flow along the tube being reversed to the helical flow caused by the cone, the presence of the cone and the shear helix causing the aqueous streams to mix with one another with shear, and causing the product leaving the outlet to be at a pressure of atmospheric pressure or less and which is at least 40 psi below the pressure in the inlet of the bulk of the water.

2. Apparatus according to claim 1 in which the shear helix comprises a length of sheet material that has been cut from its edges towards the centre at intervals along its length and twisted into a helix.

3. Apparatus according to claim 2 in which the width of the sheet material is substantially the diameter of the tube.

4. Apparatus according to claim 1 in which the mixing tube comprises at least two shear helices in end to end relationship.

5. Apparatus according to claim 1 in which the mixing tube has three inlets.

6. Apparatus according to claim 5 in which one inlet is a pipe coaxial with the mixing tube and two inlets are pipes arranged at an angle of at least 120° to the mixing tube.

7. Apparatus according to claim 1 including an inlet pipe leading to each inlet and in which all the inlet pipes and the mixing tube are in the same plane.

8. Apparatus according to claim 1 including an inlet pipe leading to each inlet and in which the inlet pipes and the mixing tube are formed in a solid block of plastics material.

* * * * *